US008024524B2

(12) United States Patent
Benhase et al.

(10) Patent No.: US 8,024,524 B2
(45) Date of Patent: Sep. 20, 2011

(54) METHOD, SYSTEM, AND PROGRAM FOR AN ADAPTOR TO READ AND WRITE TO SYSTEM MEMORY

(75) Inventors: Michael Thomas Benhase, Tucson, AZ (US); James Chien-Chung Chen, Tucson, AZ (US); Yu-Cheng Hsu, Tucson, AZ (US); Matthew Joseph Kalos, Tucson, AZ (US); Carol Spanel, San Jose, CA (US); Andrew Dale Walls, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 19 days.

(21) Appl. No.: 12/537,987

(22) Filed: Aug. 7, 2009

(65) Prior Publication Data
US 2010/0161902 A1 Jun. 24, 2010

Related U.S. Application Data

(62) Division of application No. 10/990,039, filed on Nov. 15, 2004, now Pat. No. 7,627,716.

(51) Int. Cl.
G06F 12/00 (2006.01)
G06F 12/08 (2006.01)

(52) U.S. Cl. ............... 711/118; 711/154; 711/E12.001; 711/E12.017

(58) Field of Classification Search .................. None
See application file for complete search history.

(56) References Cited

U.S. PATENT DOCUMENTS

| 5,577,200 A * | 11/1996 | Abramson et al. ............ 714/50 |
| 5,802,599 A | 9/1998 | Cabrera et al. |
| 5,822,607 A | 10/1998 | Henry et al. |
| 6,636,908 B1 | 10/2003 | Winokur et al. |
| 6,643,754 B1 | 11/2003 | Challenger et al. |
| 6,715,036 B1 | 3/2004 | Burton et al. |
| 2005/0193164 A1 | 9/2005 | Royer et al. |

OTHER PUBLICATIONS

First Office Action IFW dated Mar. 17, 2008, pp. 1-20, for U.S. Appl. No. 10/990,039 by inventors M.T. Benhase, et al.
Response IFW dated Jul. 12, 2008, pp. 1-12, to First Office Action IFW dated Mar. 17, 2008, pp. 1-20, for U.S. Appl. No. 10/990,039 by inventors M.T. Benhase, et al.
Final Office Action IFW dated Oct. 22, 2008, pp. 1-14, for U.S. Appl. No. 10/990,039 by inventors M.T. Benhase, et al.
Response IFW dated Dec. 23, 2008, pp. 1-5, to Final Office Action IFW dated Oct. 22, 2008, pp. 1-14, for U.S. Appl. No. 10/990,039 by inventors M.T. Benhase, et al.
Notice of Allowance IFW dated Jan. 28, 2009, pp, 1-7, for U.S. Appl. No. 10/990,039 by inventors M.T. Benhase, et al.

(Continued)

Primary Examiner — Denise Tran
(74) Attorney, Agent, or Firm — David W. Victor; Konrad Raynes & Victor LLP

(57) ABSTRACT

Provided are a method, system, and program for an adaptor to read and write to system memory. A plurality of blocks of data to write to storage are received at an adaptor. The blocks of data are added to a buffer in the adaptor. A determination is made of pages in a memory device and I/O requests are generated to write the blocks in the buffer to the determined pages, wherein two I/O requests are generated to write to one block split between two pages in the memory device. The adaptor executes the generated I/O requests to write the blocks in the buffer to the determined pages in the memory device.

15 Claims, 5 Drawing Sheets

OTHER PUBLICATIONS

RCE and Amendment IFW dated Jan. 23, 2009, pp. 1-11, to Notice of Allowance IFW dated Jan. 28, 2009, pp, 1-7, for U.S. Appl. No. 10/990,039 by inventors M.T. Benhase, et al.

Second Notice of Allowance IFW dated May 28, 2009, pp, 1-6, for U.S. Appl. No. 10/990,039 by inventors M.T. Benhase, et al.

* cited by examiner

Page Mapping

DMA Request

METHOD, SYSTEM, AND PROGRAM FOR AN ADAPTOR TO READ AND WRITE TO SYSTEM MEMORY

CROSS-REFERENCE TO RELATED APPLICATIONS

This application is a divisional application of U.S. patent application Ser. No. 10/990,039 which is U.S. Pat. No. 7,627,716, filed Nov. 15, 2004, which Application is incorporated herein by reference in its entirety

BACKGROUND OF THE INVENTION

1. Field of the Invention

The present invention relates to a method, system, and program for an adaptor to read and write to system memory.

2. Description of the Related Art

In certain computing environments, multiple host systems may communicate with one or more control units, such as an IBM Enterprise Storage Server (ESS)®, for data in a storage device managed by the ESS receiving the request. The control unit manages access to storage devices, such as interconnected hard disk drives through one or more logical paths. (IBM and ESS are registered trademarks of IBM). The interconnected drives may be configured as a Direct Access Storage Device (DASD), Redundant Array of Independent Disks (RAID), Just a Bunch of Disks (JBOD), etc. The control unit includes a host adaptor to receive I/O requests from the host. In certain systems, the host may read and write blocks of data having a certain format, such as 512 byte blocks and the control unit may store data in a different format by adding metadata to the blocks from the host, resulting in 524 bytes per block.

In one system, the host adaptor may transfer blocks to write to logical block addresses to a memory controller for a cache. The memory controller may then handle the virtual address mapping of the logical blocks to write to the physical pages in the cache. When requesting data, the host adaptor may provide the memory controller the logical blocks to read and the memory controller may translate the requested logical blocks to physical pages in the cache. The memory controller then fetches the data from the determined physical pages to return to the host adaptor to, in turn, return to the host.

SUMMARY

Provided are a method, system, and program for an adaptor to read and write to system memory. A plurality of blocks of data to write to storage are received at an adaptor. The blocks of data are added to a buffer in the adaptor. A determination is made of pages in a memory device and I/O requests are generated to write the blocks in the buffer to the determined pages, wherein two I/O requests are generated to write to one block split between two pages in the memory device. The adaptor executes the generated I/O requests to write the blocks in the buffer to the determined pages in the memory device.

DETAILED DESCRIPTION

Figure 1:
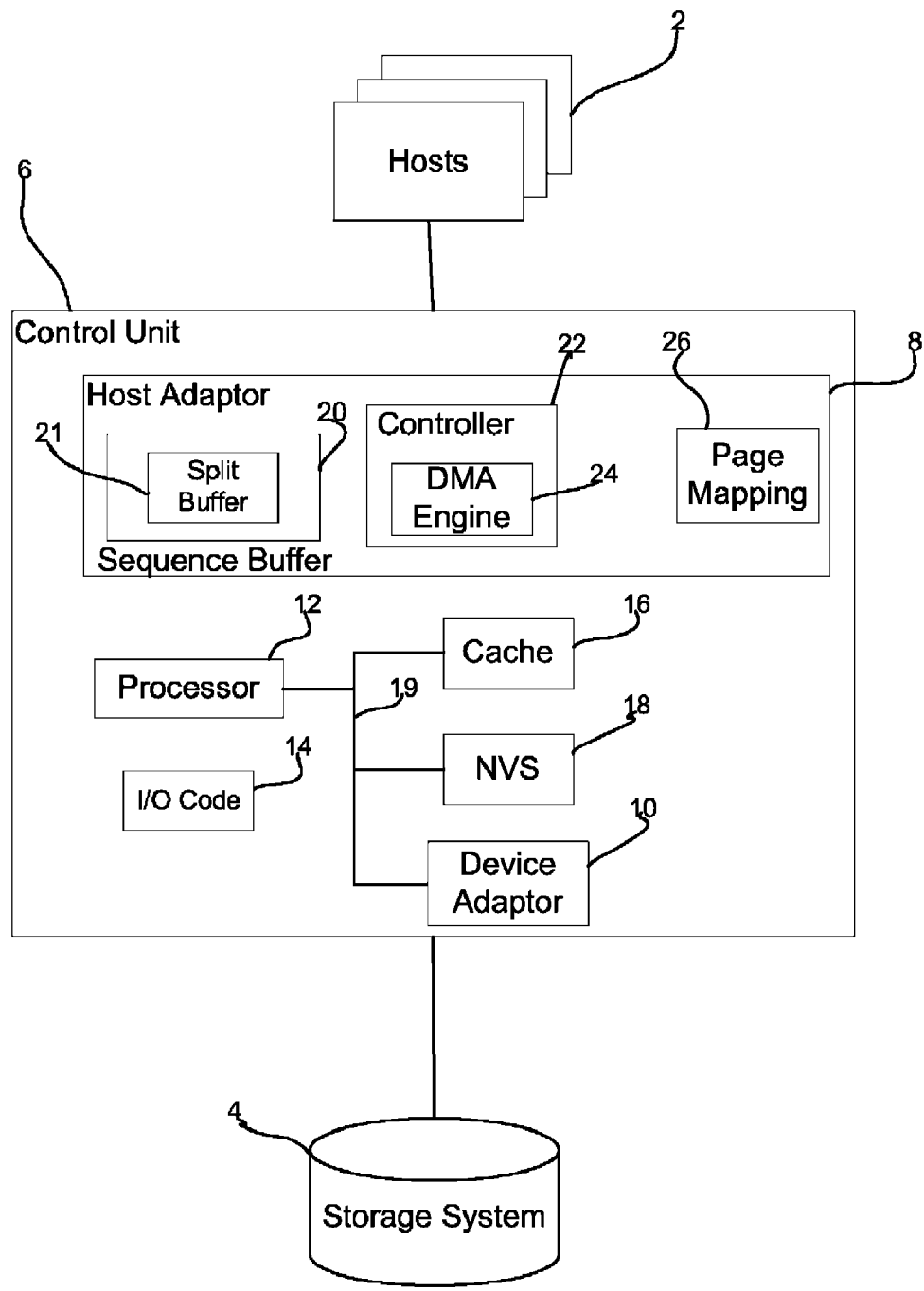
FIG. 1 illustrates an embodiment of a computing environment.

FIG. 1 illustrates an embodiment of a computing environment. One or more hosts 2 communicate Input/Output (I/O) requests directed to one or more storage systems 4 (only one is shown) to a control unit 6, where the control unit 6 manages access to the storage system 4. The control unit 6 includes a host adaptor 8 to enable network communication with the hosts 2 and a device adaptor 10 enabling communication with one or more storage systems 4. The control unit 6 further includes a processor 12 that executes I/O code 14 to manage I/O requests and a cache 16 to store updates to data in the storage system 4 or data requested by the hosts 2. A non-volatile storage system (NVS) 18 is used to provide an additional non-volatile backup of updates to data in the storage system 4, such as a battery backed-up memory device. Bus 19 enables communication between the different control unit 6 components and may comprise one or more bus interfaces. The control unit 6 may include a dual processor system, with an additional processor, cache and NVS.

The host adaptor 8 includes a sequence buffer 20 to store blocks of data in the storage system 4 to return to the host 2 or to update in the storage system 4. A split buffer 21 within the sequence buffer is used to buffer split blocks as described below. The host adaptor 8 further includes an adaptor controller 22 that includes firmware or code to perform the host adaptor operations 8 and a Direct Memory Access (DMA) engine 24 that enables the host adaptor 8 to read or write directly to the cache 16 and NVS 18 without going through the processor 12. The adaptor controller 22 builds a page mapping 26 that provides a mapping of logical blocks, such as Logical Block Addresses (LBAs) in one or more logical tracks, to physical pages in the cache 16. The adaptor controller 22 uses the page mapping 26 to generate DMA I/O requests to cause the DMA engine 24 to read or write logical blocks at the corresponding pages identified in the page mapping 26.

The hosts 2, storage system 4, and control unit 6 may communicate over a network (not shown), which may comprise a local area network (LAN), storage area network (SAN), bus interface, serial interface, etc. The control unit 6 may comprise any type of server, such as an enterprise storage server, storage controller, etc., or other device used to manage I/O requests to attached storage system 4. The storage system 4 may include storage devices known in the art, such as interconnected hard disk drives (e.g., configured as a DASD, RAID, JBOD, etc.), magnetic tape, electronic memory, etc.

Figure 2:
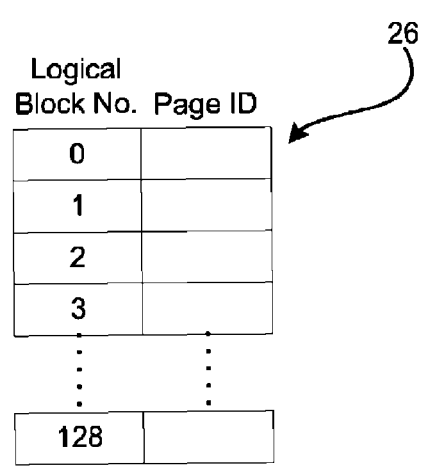
FIG. 2 illustrates an embodiment of a page mapping.

FIG. 2 illustrates an example of an embodiment of the page mapping 26 as showing how each logical block subject to an I/O request maps to physical pages in the cache 16. The control unit 6 may maintain multiple page mappings 26 if the control unit 6 writes logical blocks to both cache 16 and NVS 28, where one page mapping would provide the correspondence of logical blocks to pages in the cache 16 and another page mapping would provide the correspondence of logical blocks to pages in the NVS 18. The page mapping 26 may include a page index of the page including the corresponding logical block. In one implementation, the start location of the page in the memory (cache 16 or NVS 18) corresponding to the page ID can be determined by multiplying the page size, e.g., 4 kilobytes (KB), times the index number. Consecutive logical blocks may map to discontiguous pages in the cache 16 and NVS 28.

Figure 3:
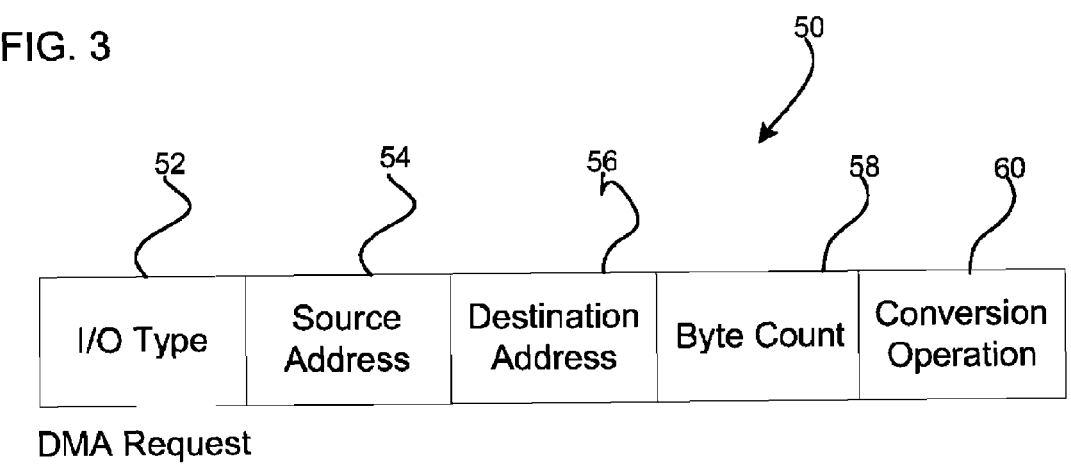
FIG. 3 illustrates information in an I/O request.

FIG. 3 illustrates an embodiment of information in the DMA I/O request 50 the adaptor controller 22 generates to cause the DMA engine 24 to read or write data directly at the cache 16 or NVS 18. The DMA request 50 includes an I/O type 52 indicating whether the request is to read or write; a source address 54 indicating the location in the sequence buffer 20 from which updated data is written; a destination address 56 indicating the location in the cache 16 or NVS 18 to which source data is written or the location in the sequence buffer 20 to which data read from cache 16 is transferred or the location in the cache 16 from which read data is transferred before being returned to the host 2; the byte count 58 indicates the number of bytes to be transferred. The source 54 and destination address 56 may indicate a page and offset into the page where the data to transfer begins. A conversion operation 60 field indicates a conversion operation to perform on data subject to the DMA transfer operation, such as adding metadata or removing metadata from the data at the source address 52 before writing the data to the destination address 56.

Figure 4:
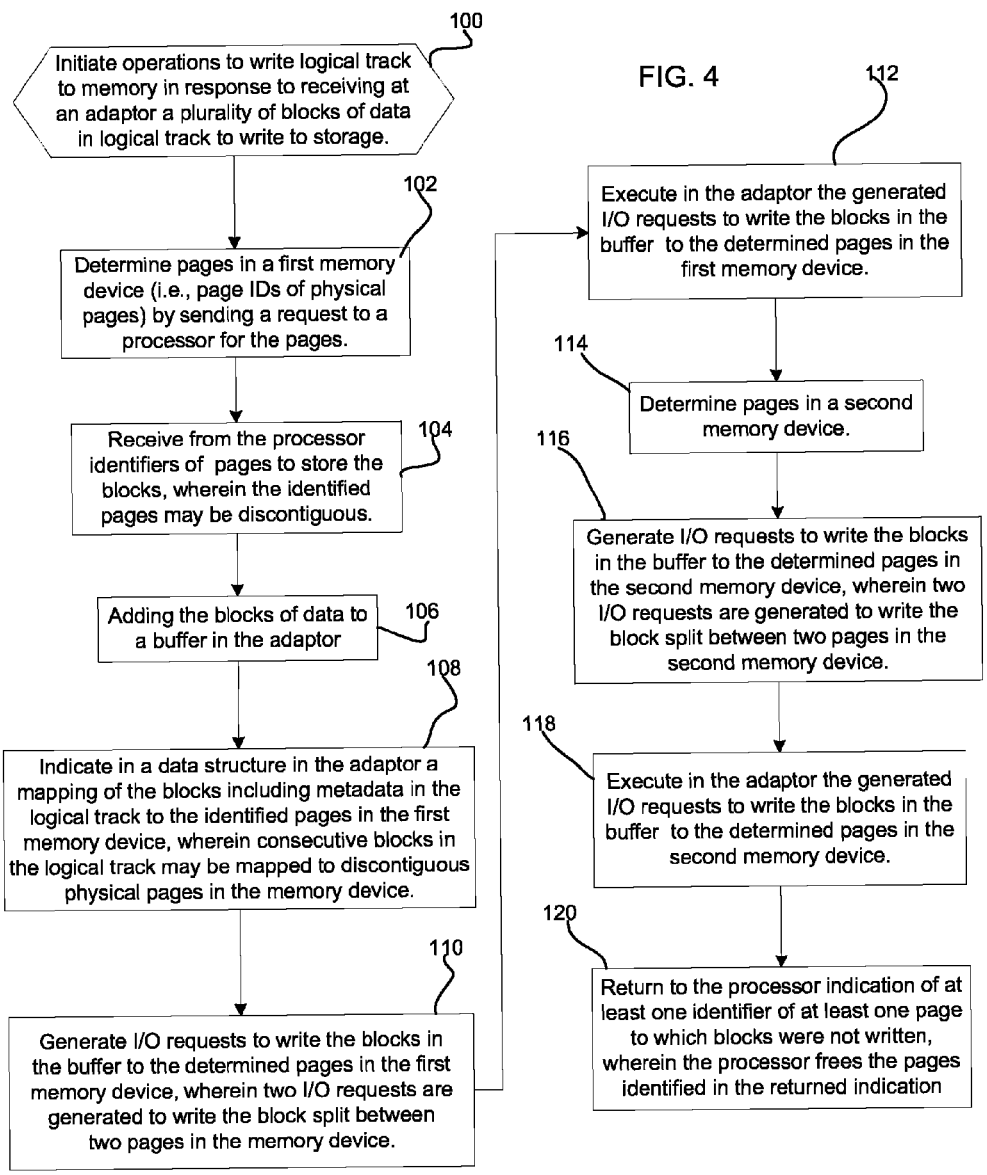
FIGS. 4 and 5 illustrate an embodiment of operations to write data.

FIG. 4 illustrates an embodiment of operations performed by the adaptor controller 2 and DMA engine 24 to write a logical track received from the host 2 to memory. Upon receiving (at block 100) at the adaptor 8 a plurality of blocks of data in a logical track to write to the storage system 4, the adaptor controller 22 determines (at block 102) pages (i.e., page IDs of physical pages) in a first memory device, e.g., cache 16. In one embodiment, the pages may be determined by sending (at block 102) a request to the processor 12 for the pages and receiving (at block 104) from the processor 12 pages in the cache 16 to store the logical blocks, wherein the pages may be discontiguous. In one embodiment, the processor 12 may automatically return enough pages to store all the logical blocks in a logical track for a track write operation. Thus, if a logical track to write has 128 blocks, each logical block plus metadata is 524 bytes, and each page is 4 KB, then the processor 12 returns seventeen free pages for the adaptor controller 22 to use. The adaptor controller 22 then adds (at block 106) the blocks of data to the buffer 20. Thus, the host 2 may be held off from sending the data to the adaptor buffer 20 until indication of pages to use are received by the adaptor 8.

The adaptor controller 22 indicates (at block 108) in a data structure, e.g., page mapping 26, in the adaptor 8 a mapping of the blocks in the logical track to write to the physical pages in the first memory device. Consecutive blocks in the logical track may map to discontiguous physical pages in the memory device 16. The adaptor controller 22 uses the page mapping 26 to generate (at block 110) DMA I/O requests to write the blocks in the buffer 20 to the determined pages in the first memory device, e.g., the cache 16. Two I/O requests are generated to write the block split between two pages in the memory device 16. The generated I/O requests are then executed (at block 112) in the adaptor 8 to write the blocks in the buffer (including appended metadata) to the determined pages in the first memory device, such as the cache 16. In one embodiment, the DMA engine 24 executes the I/O requests to write the blocks directly to the cache 16.

The adaptor controller 22 may further perform operations to write the updated blocks to a second memory device, such as the NVS 18 by determining (at block 114) pages in a second memory device, e.g., NVS 18. As with the cache 16, the adaptor controller 22 may determine the pages to write the data by requesting pages in the NVS 18 from the processor 12. The adaptor controller 22 generates (at block 116) I/O requests to write the blocks in the buffer to the determined pages in the second memory device (NVS 18), wherein two I/O requests are generated to write the block split between two pages in the second memory device (NVS 18). The DMA engine 24 in the adaptor 8 executes (at block 118) the generated I/O requests to write the blocks in the buffer 20 to the determined pages in the second memory device, e.g., NVS 18. In this way, the host adaptor 8 generates I/O requests to write an updated logical track to both cache 16 and NVS 18.

In one embodiment, the adaptor controller 22 may return (at block 120) to the processor 12 indication of at least one identifier of at least one page to which blocks were not written. In response to this indication, the processor 12 may free the pages identified in the returned indication because these pages were not written to by the adaptor. For instance, the processor may provide the controller 22 a fixed number of pages capable of including all blocks in a logical track, such as all 128 blocks. If the host 2 did not request to write to all blocks in a logical track, then those pages not used for the write may be freed. The indication of the pages to free may comprise a bitmap indicating those tracks not written to and those tracks written to. The processor 12 may then determine the pages to which blocks were not written by mapping the blocks written to as indicated in the bitmap to the pages the processor 12 provide to the controller 22 to use, and those provided pages to which written blocks did not map may be freed.

Figure 5:
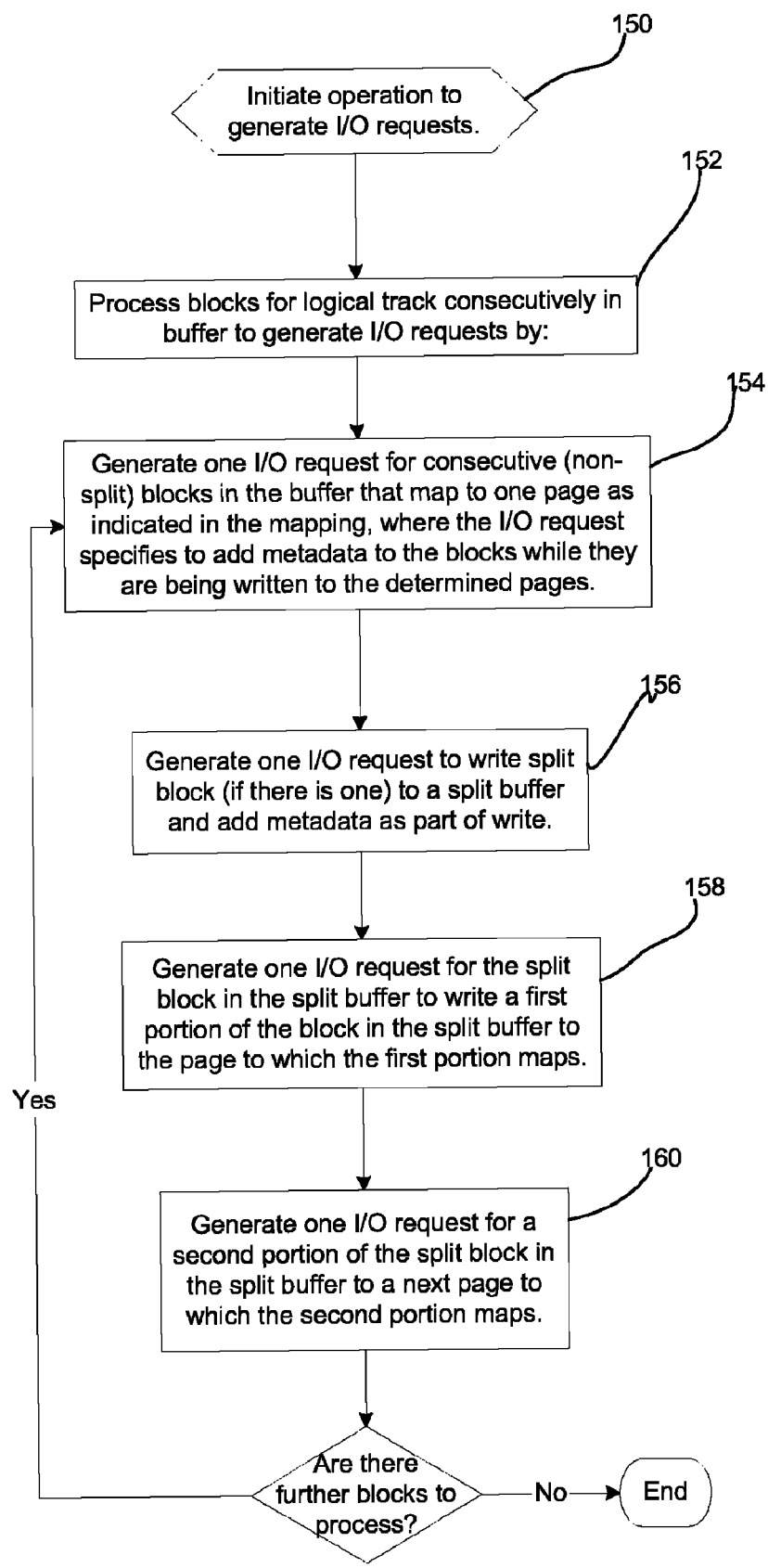

FIG. 5 illustrates one embodiment of how the adaptor controller 22 generates the I/O requests to write the blocks to pages in the cache 16 and append metadata to the blocks as they are being written into the cache 16 and/or NVS 18. The operations of FIG. 5 may be performed at blocks 110 and 116 in FIG. 5. Upon initiating the operation to generate the I/O requests (at block 150), the adaptor controller 22 processes (at block 152) the blocks for a logical track sequentially, as indicated in the page mapping 26 and performs the operations at blocks 154-160. The adaptor controller 22 generates (at block 154) one I/O request for consecutive (non-split) blocks in the buffer 20 that map to one page as indicated in the mapping 26, where the I/O request specifies to add metadata to the blocks while they are being written to the determined pages. In one embodiment, the I/O request may comprise a DMA request 50, where the conversion operation 60 field indicates to add metadata to the block being written. One I/O request is then generated (at block 156) to write a split block (if there is one) following the just written non-split consecutive blocks to a split buffer 21 in the adaptor 8 and add metadata as part of the write. After the metadata is added, one I/O request is generated (at block 158) to write a first portion of the split block in the split buffer 21 to the page to which the first portion maps and one I/O request is generated (at block 160) to write a second portion of the split block in the split buffer 21 to a next page to which the second portion maps. If (at block 162) there are still further logical blocks indicated in the page mapping 26 to write to further pages, then control returns to block 154 to generate one or more I/O requests to write the remainder of the logical blocks to one or more pages. Otherwise, if I/O requests, e.g., DMA write requests, have been generated for all logical blocks indicated in the page mapping 26, then the process of generating I/O requests ends.

Figure 6:
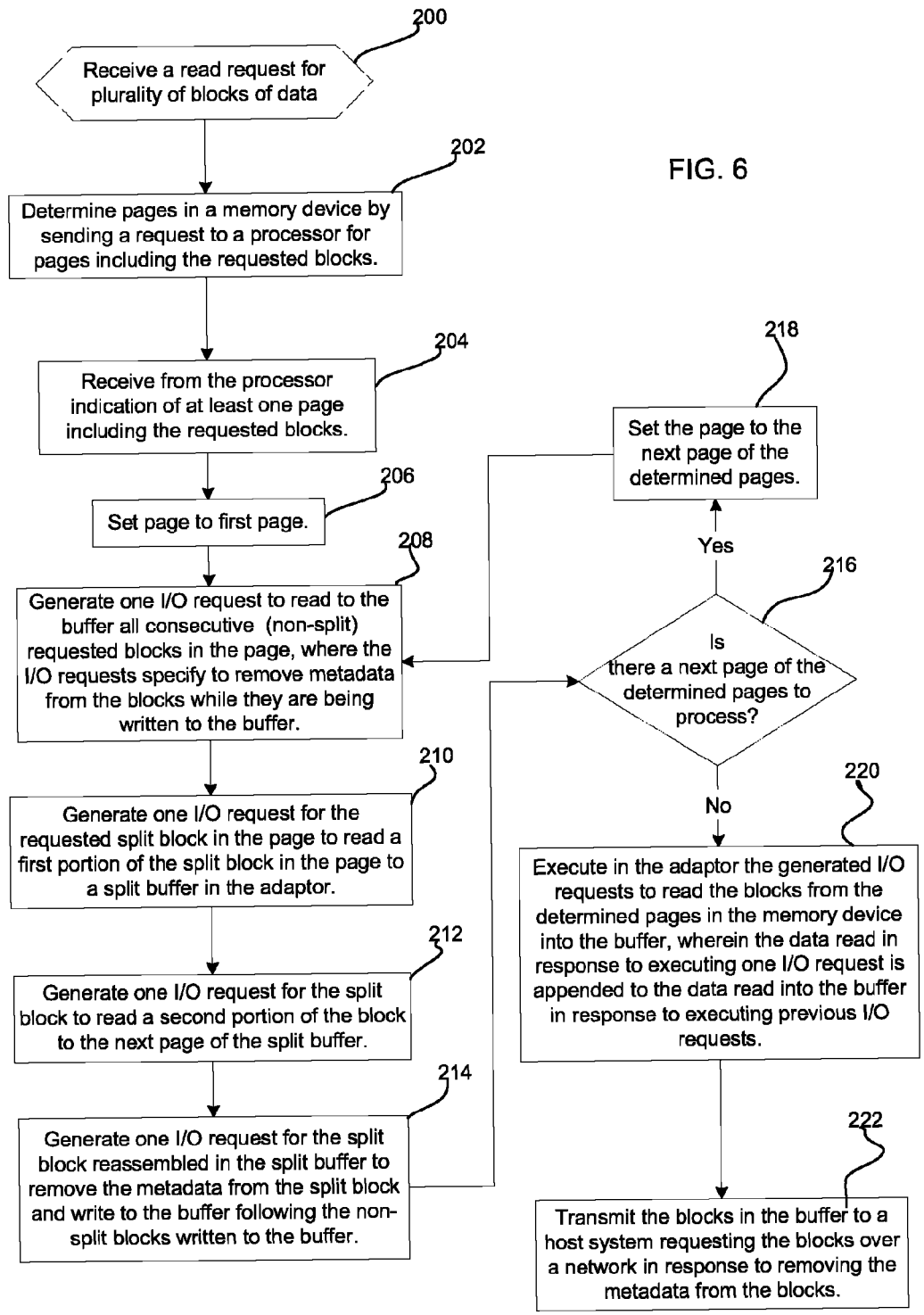
FIG. 6 illustrates an embodiment of operations to read data.

FIG. 6 illustrates an embodiment of operations to process a read request from a host 2. Upon receiving (at block 200) a read request from a host 2 for a plurality of blocks of data, which may span one logical track, the adaptor controller 22 determines (at block 202) pages in a memory device, e.g., cache 16, including the requested data. In one embodiment, the pages may be determined by the adaptor controller 22 by sending (at block 202) a request to the processor 12 for pages including the requested blocks. The controller 22 receives (at block 204) from the processor 12 indication of at least one page including the requested blocks. The controller 22 generates I/O requests to read the blocks from the determined pages in the memory device, e.g., cache 16, into a buffer, e.g., the sequence buffer 20, in the adaptor 8. At least one of the blocks is split between two pages in the cache 16. The I/O requests may comprise DMA requests for the DMA engine 24. Blocks 206-218 provide one embodiment to generate the I/O requests.

At block 206, a page is set to the first page of the received pages. The adaptor controller 22 generates (at block 208) one I/O request to read to the buffer 20 all consecutive (non-split) requested blocks in the page, where the I/O requests specify to remove metadata from the blocks while they are being written to the buffer. The operation to remove metadata from the blocks as they are written may be indicated in the conversion operation field 60. One I/O request is generated (at block 210) for the requested split block in the page to read a first portion of the split block in the page to a split buffer 21 in the adaptor 8 and generates (at block 212) one I/O request for the split block to read a second portion of the block to the next page of the split buffer 21. The adaptor controller 22 then generates (at block 214) one I/O request for the split block reassembled in the split buffer 21 to remove the metadata from the split block and write to the buffer 20 following the non-split blocks written to the buffer 20. Thus, the 524 byte blocks read into the split buffer 21 having the metadata may be reduced to 512 byte blocks stripped of their metadata to write to the buffer 20 and return to the host 2. If (at block 216) there is a next page of the determined pages to process, then the page is set (at block 218) to the next page of the determined pages. In generating the I/O requests, the controller 22 may construct a page mapping 26 of blocks to the pages returned by the processor. If the first requested block to read is at an offset within the first returned page, i.e., not the first block of the logical track included in the first page, then the controller 22 includes in the first I/O request the offset in the page where the first requested block is located.

If there are no further pages to read from, then the adaptor controller 22 executes (at block 220) the generated I/O requests to read the blocks from the determined pages in the memory device, e.g., cache 16, into the buffer 20, the adaptor 8, such as the DMA engine 24, executes (at block 222) the generated I/O requests to read the blocks from the determined pages in the memory device, e.g., cache 16, into the buffer 20. The data read in response to executing one I/O request is appended to the data from the read request previously read into the sequence buffer 20. The blocks in the buffer 20 are transmitted (at block 212) to a host 2 requesting the blocks over a network in response to removing the metadata from the blocks. In this embodiment, the operations to add and remove metadata are performed in the adaptor 8.

With the described embodiments, the host adaptor 8 handles the mapping of logical blocks to physical pages in the memory device(s) to which the I/O request is directed. The adaptor then transfers the data directly to the memory to bypass the processor 12. In the described embodiments, the host adaptor 8 queries the processor 12 to determine physical pages in the memory device to use for the I/O request. Further, in one embodiment, the generated I/O requests may retrieve or write to blocks that span multiple pages in separate I/O requests.

Additional Embodiment Details

The described embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

FIGS. 2 and 3 show certain information included in a page mapping and DMA request. In alternative embodiments, this information may be stored in different data structures having different formats and information than shown.

Certain embodiments may be directed to a method for deploying computing instructions by a person or automated processing integrating computer-readable code into a computing system, wherein the code in combination with the computing system is enabled to perform the operations of the described embodiments.

The illustrated operations of FIGS. 4, 5, and 6 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:
1. A method, comprising:
    receiving a read request for plurality of blocks of data;
    determining pages in a memory device including the requested blocks by:
        sending a request to a processor for pages including the requested blocks; and receiving from the processor indication of at least one page including the requested blocks, wherein the determined pages comprise the received indicated pages;

generating I/O requests to read the blocks from the determined pages in the memory device into a buffer in an adaptor, wherein at least one of the blocks is split between two pages in the memory device; and executing in the adaptor the generated I/O requests to read the blocks from the determined pages in the memory device into the buffer.

2. The method of claim 1, wherein generating the I/O requests further comprises:

generating an I/O request to read to the buffer requested blocks in one determined page;

generating an I/O request to read to a split buffer in the buffer a first portion of a split block in the determined page;

generating an I/O request to read to the split buffer a second portion of the split block in a next determined page in the memory device, wherein the second portion does not fit into the determined page;

generating an I/O request to read the split block in the split buffer into the buffer; and repeating the operations of generating the I/O requests to read the requested blocks from the determined pages consecutively into the buffer.

3. The method of claim 2, wherein the I/O request reading the split block from the split buffer removes metadata from the split block before the block is read into the buffer.

4. A method, comprising:

receiving a read request for a plurality of blocks of data;

determining pages in a memory device including the requested blocks, wherein the blocks in the pages include metadata;

generating I/O requests to read the blocks from the determined pages in the memory device into a buffer in an adaptor, wherein at least one of the blocks is split between two pages in the memory device;

executing in the adaptor the generated I/O requests to read the blocks from the determined pages in the memory device into the buffer; and removing the metadata from blocks in the pages read into the buffer.

5. The method of claim 4, further comprising:

transmitting the blocks in the buffer to a host system requesting the blocks over a network in response to removing the metadata from the blocks.

6. A system, comprising:

a memory device;

a processor in communication with the memory device; and an adaptor in communication with the memory device and the processor and having a buffer, wherein the adaptor is capable of causing operations, the operations comprising:

receiving a read request for plurality of blocks of data;

determining pages in a memory device including the requested blocks; by:

sending a request to the processor for pages including the requested blocks; and receiving from the processor indication of at least one page including the requested blocks, wherein the determined pages comprise the received indicated pages;

generating I/O requests to read the blocks from the determined pages in the memory device into the buffer in the adaptor, wherein at least one of the blocks is split between two pages in the memory device; and executing the generated I/O requests to read the blocks from the determined pages in the memory device into the buffer.

7. The system of claim 6, wherein generating the I/O requests further comprises:

generating an I/O request to read to the buffer requested blocks in one determined page;

generating an I/O request to read to a split buffer in the buffer a first portion of a split block in the determined page;

generating an I/O request to read to the split buffer a second portion of the split block in a next determined page in the memory device, wherein the second portion does not fit into the determined page;

generating an I/O request to read the split block in the split buffer into the buffer; and repeating the operations of generating the I/O requests to read the requested blocks from the determined pages consecutively into the buffer.

8. The system of claim 7, wherein the I/O request reading the split block from the split buffer removes metadata from the split block before the block is read into the buffer.

9. A system, comprising:

a memory device;

a processor in communication with the memory device; and an adaptor in communication with the memory device and the processor and having a buffer, wherein the adaptor is capable of causing operations, the operations comprising:

receiving a read request for plurality of blocks of data;

determining pages in a memory device including the requested blocks, wherein the blocks in the determined pages include metadata;

generating I/O requests to read the blocks from the determined pages in the memory device into the buffer in the adaptor, wherein at least one of the blocks is split between two pages in the memory device;

executing the generated I/O requests to read the blocks from the determined pages in the memory device into the buffer; and removing the metadata from blocks in the pages read into the buffer.

10. The system of claim 9, further in communication with a host system over a network, wherein the adaptor is further capable of causing operations comprising:

transmitting the blocks in the buffer to the host system requesting the blocks over the network in response to removing the metadata from the blocks.

11. An article of manufacture comprising a computer readable storage device in an adaptor including code executed by a processor to perform operations, wherein the adaptor includes a buffer and is in communication with a memory device caching data for a storage, wherein the operations comprise:

receiving a read request for plurality of blocks of data;

determining pages in the memory device including the requested blocks by:

sending a request to a processor for pages including the requested blocks; and receiving from the processor indication of at least one page including the requested blocks, wherein the determined pages comprise the received indicated pages;

generating I/O requests to read the blocks from the determined pages in the memory device into the buffer, wherein at least one of the blocks is split between two pages in the memory device; and executing in the adaptor the generated I/O requests to read the blocks from the determined pages in the memory device into the buffer.

12. The article of manufacture of claim 11, wherein the buffer includes a split buffer, and wherein generating the I/O requests further comprises:

generating an I/O request to read to the buffer requested blocks in one determined page;

generating an I/O request to read to the split buffer a first portion of a split block in the determined page;

generating an I/O request to read to the split buffer a second portion of the split block in a next determined page in the memory device, wherein the second portion does not fit into the determined page;

generating an I/O request to read the split block in the split buffer into the buffer; and repeating the operations of generating the I/O requests to read the requested blocks from the determined pages consecutively into the buffer.

13. The article of manufacture of claim 12, wherein the I/O request reading the split block from the split buffer removes metadata from the split block before the block is read into the buffer.

14. An article of manufacture comprising a computer readable storage device in an adaptor including code executed by a processor to perform operations, wherein the adaptor includes a buffer and is in communication with a memory device caching data for a storage, wherein the operations comprise:

receiving a read request for plurality of blocks of data determining pages in the memory device including the requested blocks, wherein the blocks in the determined pages include metadata;

generating I/O requests to read the blocks from the determined pages in the memory device into the buffer, wherein at least one of the blocks is split between two pages in the memory device;

executing in the adaptor the generated I/O requests to read the blocks from the determined pages in the memory device into the buffer; and removing the metadata from blocks in the pages read into the buffer.

15. The article of manufacture of claim 14, wherein the adaptor is in communication with a host system over a network, and wherein the operations further comprise:

transmitting the blocks in the buffer to the host system requesting the blocks over the network in response to removing the metadata from the blocks.

* * * * *